S. D. & G. W. ALBRIGHT.
MACHINES FOR MAKING AND SAPPING SHINGLE-BOLTS.
No. 193,746. Patented July 31, 1877.
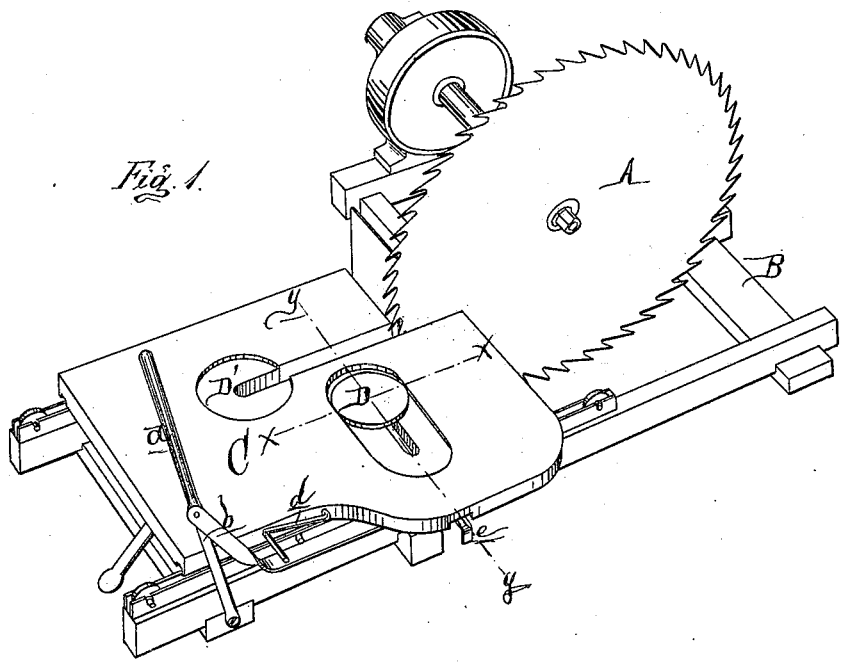
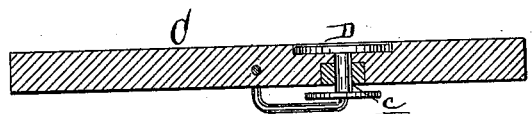
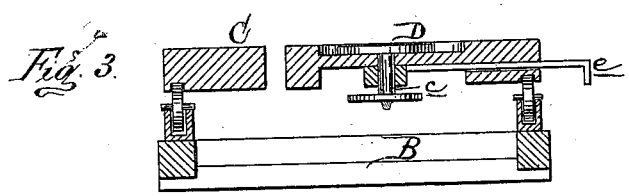

UNITED STATES PATENT OFFICE.

SPENCER D. ALBRIGHT AND GEORGE W. ALBRIGHT, OF STANTON, MICH.

IMPROVEMENT IN MACHINES FOR MAKING AND SAPPING SHINGLE-BOLTS.

Specification forming part of Letters Patent No. 193,746, dated July 31, 1877; application filed January 15, 1877.

*To all whom it may concern:*

Be it known that we, SPENCER D. ALBRIGHT and GEORGE W. ALBRIGHT, of Stanton, in the county of Montcalm and State of Michigan, have invented an Improvement in Machines for Making and Sapping Shingle-Bolts, of which the following is a specification:

The nature of our invention relates to an improvement in machines of that variety wherein a wooden block is stood on end upon a sliding table and fed up to a circular saw, which splits it into shingle-bolts; and its object is to so construct the table that the block may be "sapped" by the same saw, preparatory to bolting it.

The invention consists, mainly, in a turn-table in the sliding table, on which to stand the block and turn it, preparatory to presenting it to the saw.

Figure 1 is a perspective view of the machine; Fig. 2 is a longitudinal section at $x\,x$. Fig. 3 is a cross-section at $y\,y$.

In the drawing, A represents a circular saw whose arbor is journaled in suitable bracket-standards on an L-shaped frame, B, having ways upon which a saw-table, C, slides, said table being slotted far enough to permit a block standing thereon to be fed onto the saw until its center is sawed into. The table is provided with an adjustable stop, to prevent it from being run onto the saw the full depth of the slot. A lever, $a$, is pivoted to the outer or right-hand way-stringer, to move the table back and forth, it being connected therewith by a link, $b$. The table is widened on the outer side to receive the block which is to be bolted, and transversely slotted to receive the pendent central shank $c$ of a turn-table, D. The table is routed out, so that the upper surface of said turn-table is a trifle below that of the table proper. A treadle-lever, $d$, is so hung or journaled under the table that, if its outer end be depressed by the sawyer's foot, the widened inner end pressing against the lower end of the shank $c$ will raise the turn-table D above the plane of table C. The turn-table D is moved toward or away from the saw by a bar, $e$, through an eye, at the inner end of which the shank $c$ passes. D' is another turn-table in the path of the saw, slotted to pass partly onto the saw, and which may be raised above the surface of the table C, in which it is pivoted by a treadle, but is not otherwise adjustable.

In the manufacture of shingle-bolts, it has heretofore been the practice to remove the bark and sap from the blocks by hewing or splitting it off with an ax. It has also been done, to a certain extent, with a circular saw and sliding table; but, owing to the frequent adjustments and handling of the block and removed pieces required in the process, it is found to be disadvantageous, as compared with the cost of splitting it off.

In using our machine, to accomplish the preliminary "barking" and "sapping," the blocks are placed on end on the turn-table D. The saw-table is then moved forward to saw off a segment from the side of the block. The table is then run back, and, by depressing the treadle $d$, the block is raised clear from the table, when it can be quickly turned with the turn-table to present a fresh side to the saw. The entire periphery is thus quickly sapped, when the block is placed on the turn-table D', and by three or more radial cuts to the center it is bolted.

What we claim as our invention is—

1. The combination, with a sliding saw-table, of a turn-table, pivoted at one side of the cutting-line, substantially as and for the purpose set forth.

2. The combination, with a sliding saw-table, of a turn-table, pivoted at one side of the cutting-line, and laterally adjustable with relation thereto, substantially as described.

SPENCER D. ALBRIGHT.
GEORGE W. ALBRIGHT.

Witnesses:
J. EUGENE MERRIS,
JAMES R. HARRISON.